INVENTOR.
CHARLES H. LANPHIER

INVENTOR.
CHARLES H. LANPHIER
BY Brown, Jackson,
Boettcher & Dienner
ATTYS.

INVENTOR.
CHARLES H. LANPHIER

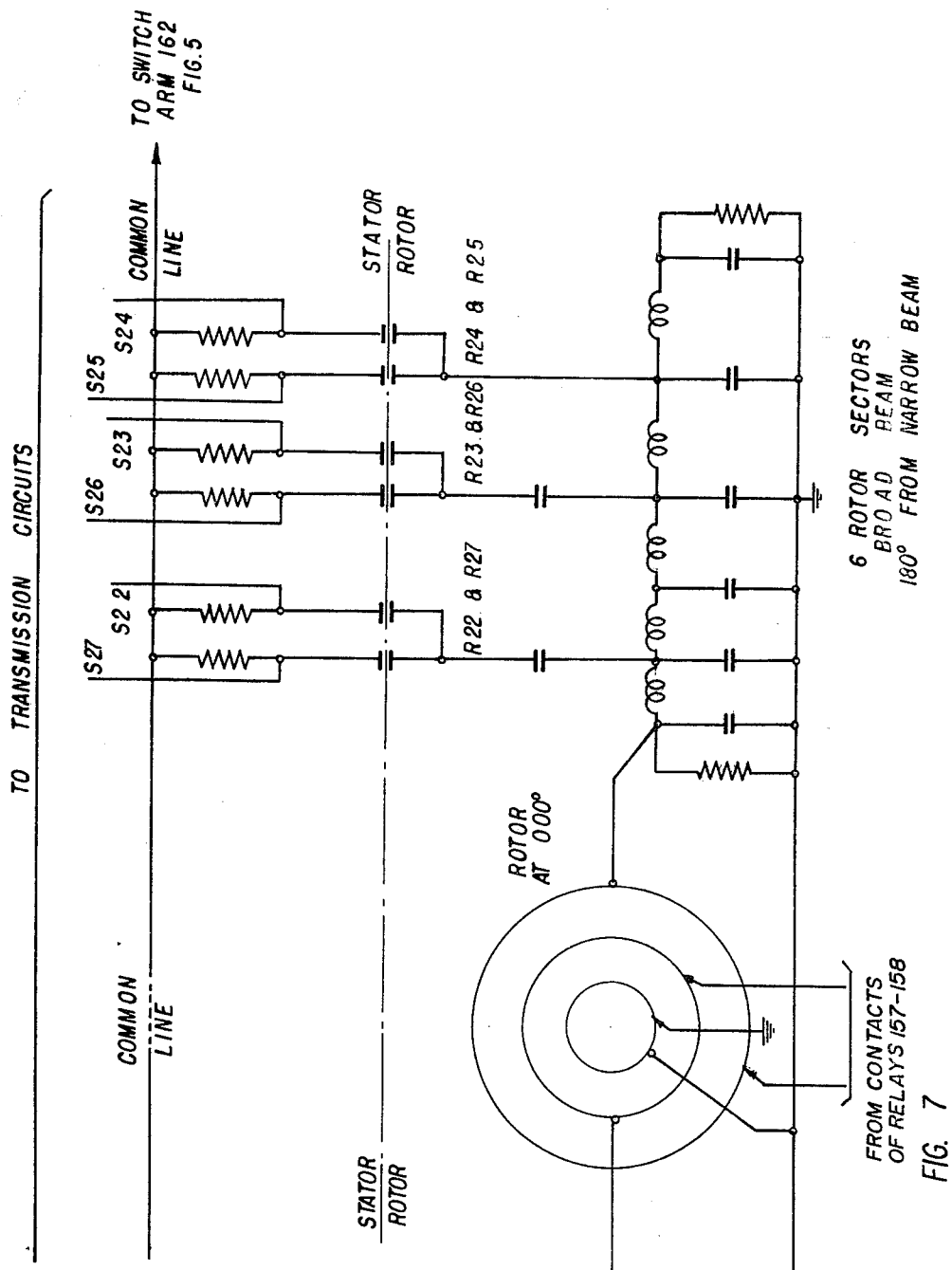

United States Patent Office 3,497,868
Patented Feb. 24, 1970

3,497,868
ECHO RANGING SYSTEM
Charles H. Lanphier, Springfield, Ill., assignor, by mesne assignments, to Sangamo Electric Company, Springfield, Ill., a corporation of Delaware
Filed June 17, 1957, Ser. No. 667,306
Int. Cl. G01s 9/66
U.S. Cl. 340—3                                                7 Claims This invention is directed to echo ranging systems, and more particularly to the transmission and reception of information in such systems.

The systems of sound navigation and ranging known generically as "sonar" systems usually comprise means for generating electrical energy, coupling this energy to a transducer and converting the electrical energy into mechanical energy and thus effecting movement of the water adjacent the transducer. The mechanical vibrations effected by the transducer are transmitted through the water, and are reflected from moving or stationary targets back to the transducer itself; upon receipt, the mechanical energy is translated into electrical energy, and reproduced upon the screen of a cathode ray oscilloscope or other indicating means. The greater the range that can be obtained and the more flexible the mode of operation, the more useful is the system.

Early sonar systems might be termed "searchlight" systems, in which systems the transducer itself resembles a solid cylinder having plane surfaces at front and back. The transducer elements were arranged to emit vibrations through the water substantially perpendicular to the front surface when the transducer was excited by coupling electrical energy thereto. The transducer itself was trained or rotated in a manner similar to a searchlight or to the spot light on an automobile, and thus the direction of bearing at which the energy was transmitted was known. The area or section into which the signal from the transducer is sent is termed the "ensonified" sector. After coupling energy into the water, the position of the transducer could be maintained along the bearing of the ensonified sector to listen for any echoes which might return from a target positioned somewhere on this bearing. After listening for an echo, the transducer could be rotated a few degrees, and the entire process repeated again. It is apparent that this rudimentary system required a substantial time to complete a search of the 360° area surrounding the equipment. During the search time, a moving target which was just beyond effective range of the equipment when the energy was dispatched in its direction, could move within effective striking distance of the vessel utilizing such equipment before the next pulse of energy was transmitted along the same bearing. Accordingly, some method of effecting a more rapid sweep of the entire 360° surrounding the vessel using such equipment was required.

One improvement upon the rudimentary searchlight sonar system is the more efficient "omnidirectional" (OMNI) transmitting system. In the OMNI system, the transducer is comprised of a plurality of elements, which are arranged in a manner similar to the staves of a barrel. The transducer represented by the barrel may project downwardly from the vessel into the water, so that the staves are generally arranged in a circular pattern about the center of the transducer itself. Such a transducer is disclosed in Patent No. 2,515,154, entitled "Transducer," which issued to applicant on July 11, 1950 and is assigned to the assignee of the present invention. If electrical energy is coupled to all of the staves simultaneously, energy is transmitted through the water in a circular wave pattern, much as circular ripples progress outwardly from the point where a stone is dropped into a still body of water. Energy is then reflected back from an object toward the multiple staves of the transducer. To derive bearing indication from the returning energy, a structure can be coupled to the transducer to rotate rapidly and sample the condition of the several staves in turn; the stave nearest the object will, of course, receive the returning energy before the stave on either side of such stave. Such OMNI systems are now well known and understood, and are described, for example, in the instruction book for sonar set AN/SQS-4, MOD 4, NAVSHIPS 92283(A).

The advent of the omnidirectional transmitting system marked a distinct advance over the early searchlight system, but there remained certain limitations and disadvantages in the OMNI system. For example, the power which can be transmitted to all of the staves simultaneously in the OMNI system, and thus the effective range of the system, is theoretically limited by the level at which cavitation occurs. By cavitation is meant the formation of a partial vacuum or vacuums in a liquid as a result of the separation of the liquid. In this case, the water adjacent the transducer elements is agitated as the transducer elements are vibrated in response to electrical energy being coupled thereto. As a practical matter, the source level of power in the water at any direction from the transducer is limited by the power which the transducer is capable of delivering. This invention increases the source level over that realizable with OMNI Directional Transmission by exciting the individual staves of the transducer with signals phased in such a manner that a beam is formed in the water by energy from a group of staves. For example, if the instantaneous position of the beam has its center between Staves 1 and 48, the signals supplied to Staves 47 and 2 will be phased so that their energy will add to that emitted by Staves 48 and 1, and the signals supplied to Staves 46 and 3 will be phased so that their energy will also add to that emitted by Staves 48 and 1. Thus all of the staves in use will have their input power so phased that all energy emitted will add directly in the direction of the center of the beam causing an increase in the source level of power in the water over that obtainable in any given direction with OMNI Directional Transmission.

By energizing less than half the number of staves, the energy per stave can be increased without increasing the total energy input or even while using less total energy input. By energizing a sufficient number of staves in proper phasing, the beam can be made narrow resulting in the emission of more energy in a smaller angle and in greater range. In order to effectively utilize a narrow beam it is necessary to scan all or pratically all of the area around a ship. Accordingly, there is a desire and need for a sonar system with increased range, which transmits energy in a narrow beam and which nevertheless may be utilized to scan all or practically all the area around the ship and do it rapidly.

It is an object of this invention to provide an echo ranging system in which the range and bearing of a target with respect to a reference position may be determined accurately and rapidly.

It is a further object of this invention to provide such a system in which the effective range is increased substantially over that permitted with known equipment.

It is another object of the invention to provide sonar equipment which incorporates the advantages of both omni-directional and narrow-beam directional equipment by swiftly rotating a narrow sector of ensonification during a single transmission to provide a very large sector of ensonification.

It is yet another object of the invention to provide a transmission system where the center bearing of a sector to be searched is variable throughout 360° in azimuth and the sector width is variable to permit a ship to limit the area of search so as not to interfere with the receiving by other friendly ships in certain locations or to communicate with friendly ships without ensonifying the area of the target.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURES 6 and 7 are schematic diagrams of structure shown generally in FIG. 5; FIGURE 9 is a schematic diagram useful in understanding the operation of the structure shown in FIGURES 1–8B.

Figure 1:
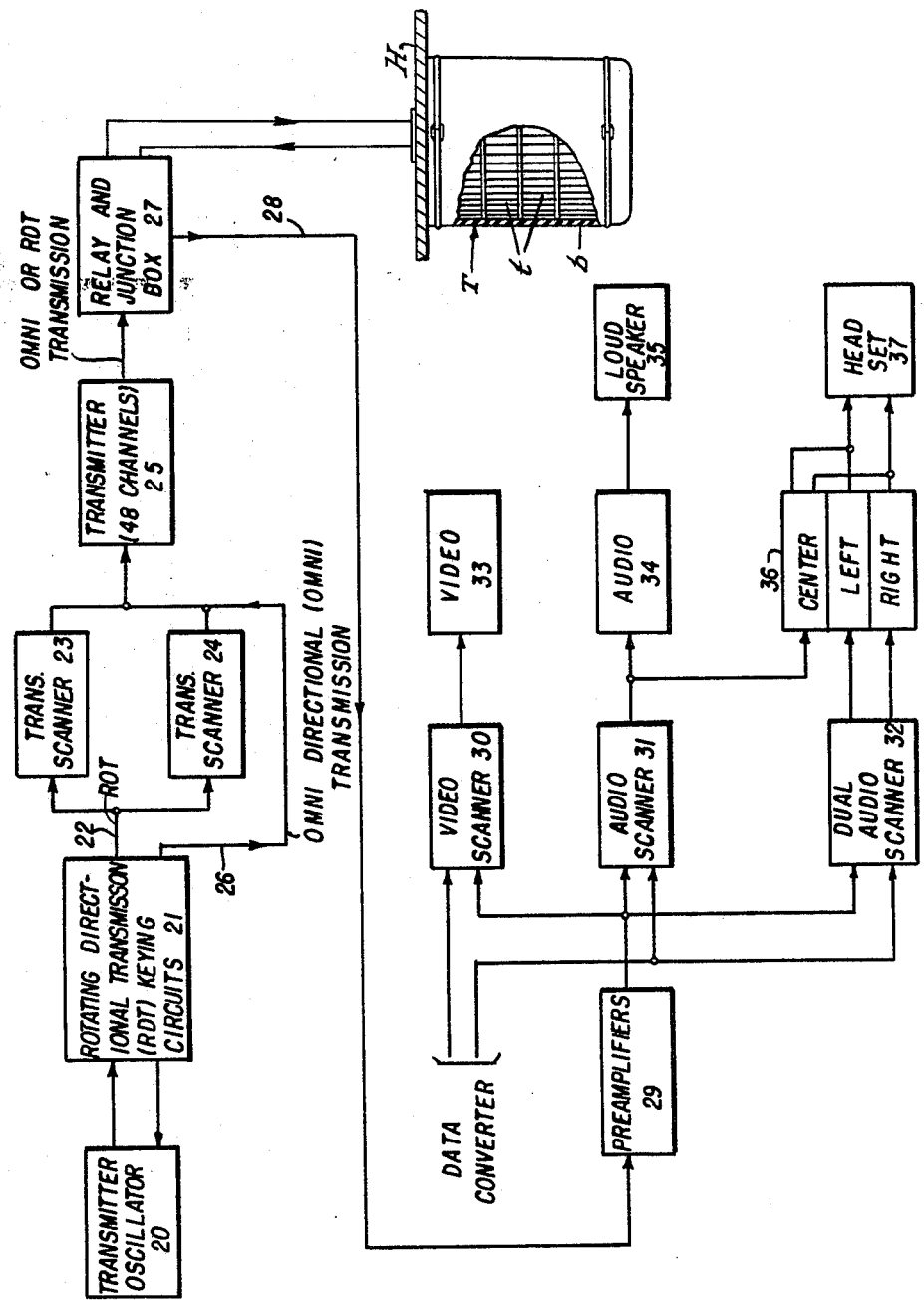
FIGURE 1 is a block diagram illustrating generally an embodiment of the invention.

In FIGURE 1, the transmitter oscillator 20 produces an alternating current signal which is coupled to the rotating directional transmission (RDT) keying circuits 21. When rotating directional transmission operation of the invention is desired, suitable signals are coupled over conductor 22 to the transmitter scanners 23 and 24. Such scanners are generally similar to the scanners of the type disclosed and claimed in U.S. Patent No. 2,790,955 issued to Charles H. Lanphier on Apr. 30, 1957, and assigned to the present assignee. The details of construction which differ from the named reference and from the scanners described and shown in NAVSHIPS 92283(A) are in the number and selection of the lag lines, two of which are disposed in each of the rotary elements of scanners 23 and 24; the construction and operation of this equipment will be described more fully hereinafter. The output signal from either transmitter scanner 23 or scanner 24 is coupled to the transmitter 25, which may be similar to a standard unit, such as shown in NAVSHIPS 92283(A). From the transmitter 25 the output signal passes through a relay and junction box 27 to a stationary or non-rotating type of transmitting and receiving transducer T which projects downwardly and outwardly from the hull H of the ship below the water level. This stationary transducer T is of the vertical cylindrical type conventionally used for omnidirectional transmisison, and is made up of a circularly arranged series of vertical staves $t$ (usually 48 in number), each of these staves embodying either magnetostrictive or piezoelectric elements, as disclosed in the aforementioned NAVSHIPS 92283(A), and also in my prior Patent 2,515,154. This stationary transducer is usually encased in a cylindrical rubber boot $b$. The separate transmitter amplifier units for each of the forty-eight staves $t$ in the transducer T may be designed and constructed to operate at a higher power level, because practice of the invention permits higher useful power level per energized stave of the transducer without an increase in the total power input. However, the basic amplifier structures such as are normally used in sonar systems are well known and understood in the art, and a further or more detailed explanation of such amplifiers will therefore not be given.

If desired, the keying circuits 21 may be utilized to produce a keying pulse for omnidirectional (OMNI) transmission, and to couple such signal over conductor 26 to the input side of transmitter 25. In such event the OMNI signal will energize all of the transducer staves $t$ simultaneously, and produce a signal of generally circular wave form emanating from the central point represented by the transducer T. The relay and junction box 27 may be of the type shown in the above-mentioned instruction book for the AN/SQS–4 sonar system.

A returning echo from a target, propeller noise, or other signal coupled through the water to the transducer T is converted from mechanical into electrical energy and coupled over a circuit not shown to relay and junction box 27. From here the signal is coupled along conductor 28 to preamplifiers 29. The output signal from preamplifiers 29 is coupled to the input sides of video scanner 30, audio scanner 31, and dual audio scanner 32. The usual information signals from a data converter (not shown) are also coupled to the input sides of scanners 30, 31 and 32. The output signal from video scanner 30 is coupled to a video display means 33, which may comprise equipment for the visual display of range and bearing information on a cathode ray oscilloscope or other means, as is well known and understood in the art.

The output signal from audio scanner 31 is coupled through suitable audio amplification means 34 to a loudspeaker 35. Thus, an audible indication of the return of energy through the water to the stationary transducer T may be coupled to loudspeaker 35.

A portion of the output signal from audio scanner 31 is also coupled to the center channel of a multiple channel aural receiver (MCAR) 36. Dual audio scanner 32 is actually a component of MCAR 36, but is shown separately in FIGURE 1 for purposes of explanation. Separate output signals from dual audio scanner 32 are also coupled to the left and right channels of MCAR 36. The output signal from the center channel is separately combined with both the left and right channel signals and the resultant signals are separately coupled to the earphones of a headset 37. As will be shown hereinafter, the headset 37 provides a highly accurate, binaural indication of target position with respect to a preselected reference bearing.

In order to describe generally the various functions of the equipment shown generally in FIGURE 1, certain accepted terminology will be used. From the foregoing explanation, it is evident that "OMNI" refers to omnidirectional transmission from a sonar equipment, while "RDT" refers to rotating directional transmission. In RDT transmission, a "beam" is formed through a directive array, such as a lag line, and coupled through the water. The beam is relatively narrow, and may be, for example, of the order of 12 degrees. To effect the search of a large sector, the beam may be swept through a substantial angle. For example, if it is desired to search a sector of 300 degrees, it is possible to sweep the center bearing of the beam through 300 degrees during a single transmitter pulse. The effective sector which is searched will be referred to the center bearing of the beam which is swept through such sector during a single transmitter pulse. The use of the terms "beam," "center bearing," and "sector" hereinafter will be consistent with the foregoing remarks.

In general, the invention is operative to provide the rotating directional transmission (RDT) type of operation for sonar equipment. A sonar set utilizing the inventive equipment may provide for five different types of operation. The first type of operation may be the RDT type of transmission provided by the invention. The second is the conventional omnidirectional (OMNI), which is well known and understood. The third type of operation may comprise alternating RDT and OMNI transmissions. In a fourth type of operation, the sonar equipment may be utilized in a "talk" position, in which energy is sent through the water from the transducer to signal other ships in the vicinity. A fifth, or "listen," type of operation is available in which the transducer is utilized to listen for sounds returning from ships to which information has been directed in the "talk" operation. These fourth and fifth types are well known and understood in the art, and will not be elaborated upon here.

In the RDT type of transmission, the beam of energy transmitted through the water is directive and very narrow, because of the phasing and shading in the lag line. Such phasing and shading (phase shifting and amplitude variation) are well known and understood in the art, and are normally utilized to produce such a narrow beam. However, this narrow beam produced by the phasing and shading is rapidly rotated during a single transmission pulse in the RDT system, to provide a resultant wide area of ensonification. This resultant broad area is termed the "sector width," and thus it is seen that the sector width is not related to the actual beam width of the instantaneously transmitted signal. By varying the angle through which the directive beam is swept in the water, the resultant sector width may be controlled in the RDT system and may be varied from 20 to 300 degrees. As the sector width is varied, in certain types of operations the center bearing of this sector can also be varied, as will be explained more fully hereinafter. In the RDT type of transmission, three separate operating modes are available by suitable displacement of a selector switch.

The first RDT mode of operation is "Search." In this mode, the center bearing of the sector which is searched is coincident with the heading of the ship, and the sector width is fixed at 300 degrees. (As used hereinafter, "ship" refers to the vessel utilizing the inventive structure; other vessels are designated "targets.") Thus, if the ship is heading due north, the area around the ship from 000 degrees to 150 degrees and from 210 degrees to 000 degrees will be searched during the single RDT transmission.

In the second, or "Search-Attack" mode of RDT operation, the center bearing of the sector to be searched is variable throughout 360 degrees in azimuth. The sector width is also variable, from 20 to 300 degrees.

In the third or "Attack" mode of RDT operation, the sector width is again variable from 20 to 300 degrees. However, the center of the beam is no longer selectively positioned, but is positioned according to a signal representing the relative bearing of the target with respect to the ship.

The time, or pulse length, of a single transmission may also be varied. For example in a model of the RDT equipment, a pulse length of 3, 8, 30 or 80 milliseconds, is available. The selection and provision of the various pulse lengths will be explained more fully hereinafter.

The structure and operation of the invention will be set forth with respect to the various types of transmission and to the different operating modes utilizing RDT transmission. The order of description of the various types of transmission is as follows:

(A) RDT (Rotating Directional Transmission)
   (1) Search Mode
   (2) Search-Attack Mode
   (3) Attack Mode
(B) OMNI (Omnidirectional Transmission)
(C) RDT-OMNI Transmission

RDT TRANSMISSION: SEARCH MODE

Figure 2:
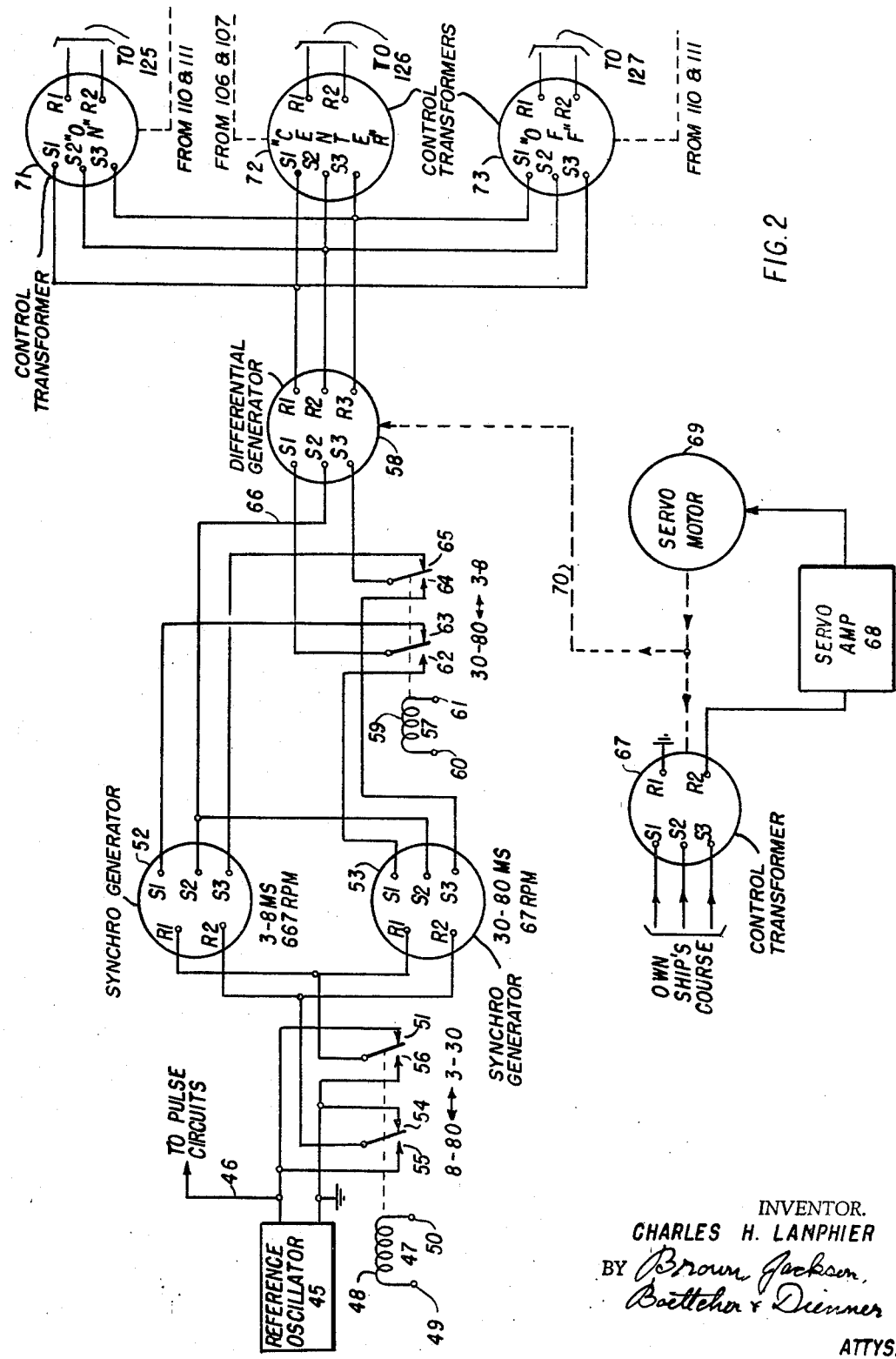
FIGURES 2–5 are schematic diagrams, partly in block form, of structure shown generally in FIGURE 1.

In FIGURE 2, a reference oscillator 45 is shown in block form. Such oscillator may be of conventional construction, utilizing feed-back circuitry and temperature-sensitive elements to provide a stable output signal varying at 2,000 cycles per second. A portion of the output signal from oscillator 45 is coupled over conductor 46 to pulse circuits not illustrated in FIGURE 2, which circuits will be described more fully hereinafter. The output signal from reference oscillator 45 is also coupled to the contacts of reversing relay 47, which has a winding 48 intermediate terminals 49 and 50. The output signal from oscillator 45 is coupled over contact 51 of reversing relay 47 to the rotor terminal R1 of each of two separate synchro generators 52 and 53. Ground potential is coupled over contact 54 of relay 47 to terminal R2 of each synchro generator 52 and 53.

The term "synchro" as used herein, refers to a rotary inductor similar to an inductor regulator, and will be recognized by those familiar with the art as a generic term used, for example, by the United States Navy to describe such inductors. The standard Navy nomenclature for the various types of synchros will be used throughout the specification. A full explanation of the term "synchro" and the various embodiments of synchro equipments is given in vol. 17, the "Components Handbook" of the Radiation Laboratory Series of the Massachusetts Institute of Technology, published by the McGraw-Hill Book Company, Inc., in 1949. Chapter 10 of this volume, from page 310 through page 355, inclusive, explains and illustrates the various types of synchros and describes such structure in the standard Navy nomenclature.

Referring again to FIGURE 2, it is evident that when winding 48 of reversing relay 47 is energized, the output signal from oscillator 45 will be coupled over contacts 55 and 56 of relay 47 to the input terminals of each of synchro generators 52 and 53. Inspection of this portion of the circuit shows that operation of relay 47 is effective to exactly reverse the connections from the output side of oscillator 45 to the input terminals of synchros 52 and 53.

By suitable driving means not illustrated in the drawings, the rotor of synchro generator 52 is rotated at an angular velocity of 667 revolutions per minute (r.p.m.), and the rotor of synchro generator 53 is rotated at a speed of 67 r.p.m. Thus the 2,000 cycle signal from oscillator 45 provides a reference for the position of the rotors of the synchros 52 and 53, and a reference for the pulse circuits to which the 2,000 cycle signal is coupled.

The output signal from either synchro generator 52 or 53, depending upon the condition of pulse length relay 57, is coupled to the stator terminals of a differential generator 58. The relay 57 comprises a winding 59 between terminals 60 and 61.

Relay 57 has a series of contacts 62–65 for coupling an output signal from either synchro generator 52 or 53 to the input terminals of differential generator 58. In the de-energized condition of relay 57, as shown in FIG. 2, the output of the 667 r.p.m. generator 52 is coupled to differential generator 58; when relay 57 is energized, the output of the 67 r.p.m. generator 53 is coupled to differential generator 58.

The output signal of either synchro generator 52 or 53 is indicative of the relative bearing of the beam transmitted from the sonar equipment. It is this relative bearing indication which is coupled to the input terminals of differential generator 58. However, another input signal is also coupled to differential generator 58 by mechanically positioning its rotor.

A signal from a ship's gyro or other suitable reference means which is indicative of the ship's course, is coupled to the input terminals of a control transformer 67. The output signal from control transformer 67 is coupled through a servo amplifier 68 to a servo motor 69. A portion of the output signal from servo motor 69 is utilized to position the rotor of control transformer 67, thus effecting the mechanical feedback. The remainder of the output signal from servo motor 69 is coupled, as illustrated by the broken line 70, to the rotor of differential generator 58. Addition of this "own ship's course" signal means that the output signal from differential generator 58 is representative of the true bearing of the transmitted beam.

This true bearing signal is coupled to the input terminals of three separate control transformers 71, 72, and 73. Control transformer 72 is designated "center" in FIG. 2, and it is utilized in determining the bearing of the center of the sector searched during a signal transmission pulse. Control transformers 71 and 73 are utilized to provide a signal for defining the edges of the sector thus searched. Mechanical signals are coupled to the rotors of control transformers 71–73, in addition to the electrical signals coupled to their respective input terminals from differential generator 58. The structure for deriving and coupling these various signals to the respective rotors will now be described.

Figure 3:
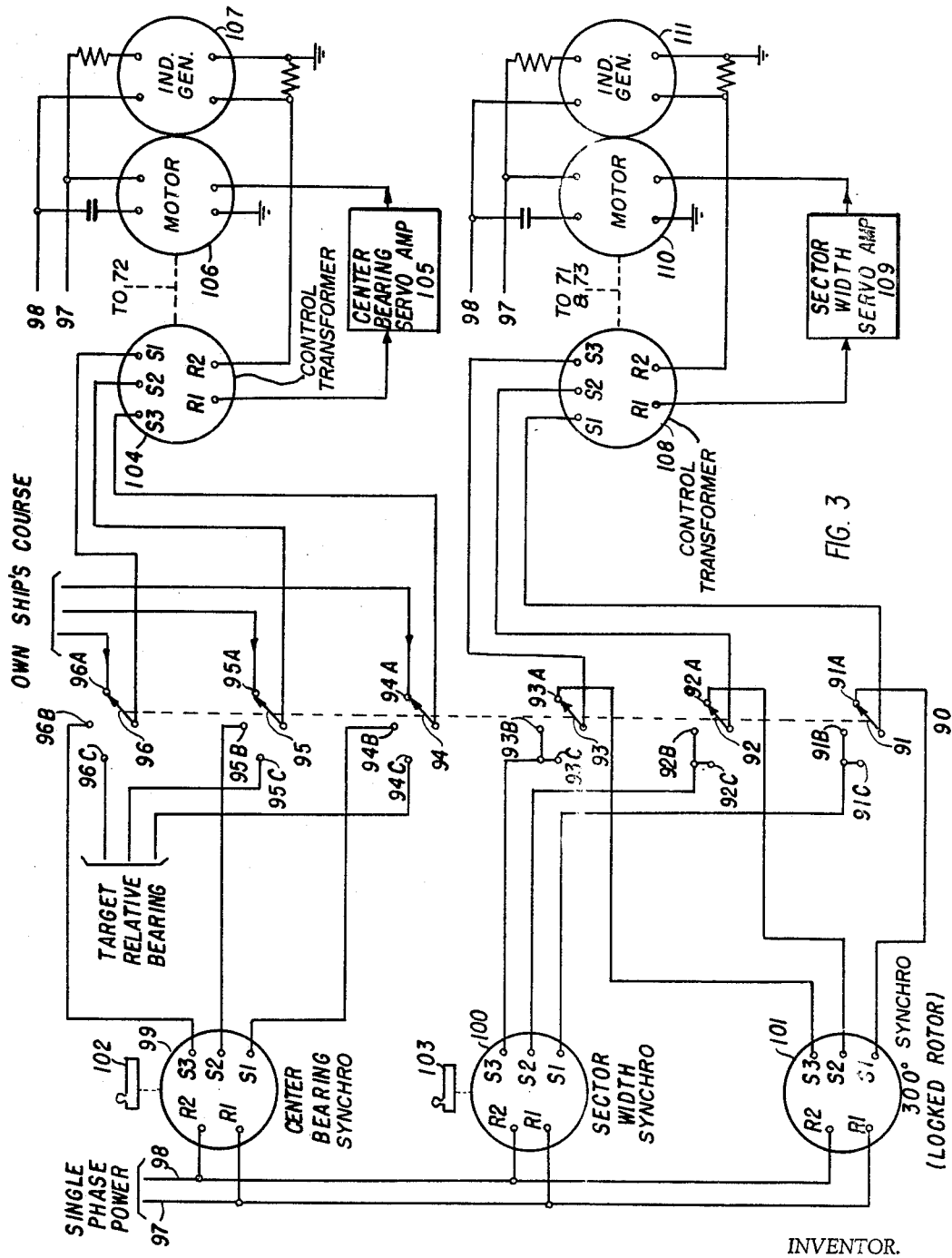

FIGURE 3 shows a pair of conductors 97 and 98 which may be coupled to a source of single phase power (not shown). Conductors 97 and 98 are coupled to the rotor input terminals of each of synchro generators 99, 100, and 101. In addition to this reference signal, another signal may be added by mechanical means to each of generators 99 and 100. Hand wheel 102 is arranged to displace the rotor of "Center Bearing" synchro generator 99 and thus alter the output signal of this generator. Similarly, a hand wheel 103 is disposed to modulate the output signal of "Sector Width" synchro generator 100 according to the angular rotation of such hand wheel. The synchro generator 101 is a "Locked Rotor" generator, having its rotor locked in such position as to furnish a signal useful in obtaining a constant 300° sector during a single transmission in the RDT type transmission.

A ganged switch 90 is constructed and arranged to effect selection of the RDT mode whenever equipment is utilized for RDT type of transmission. As shown in FIG. 3, switch 90 is in the "Search" position.

Switch 90 has six switch arms 91–96, each of which is displaceable to one of three contacts. In the "search" mode a signal indicative of the ship's course is coupled over contacts 94A–96A and switch arms 94–96 to the input terminals of a control transformer 104. An output signal from control transformer 104 is amplified in center bearing servo amplifier 105 and coupled to a motor-generator set comprising motor 106 and induction generator 107. By mechanical connections shown as a dashed line in FIGS. 2 and 3 of the drawings the motor-generator set 106–107 couples a signal to the rotor of the "center" control transformer 72 (FIG. 2).

The output signal from locked rotor generator 101 is coupled over contacts 91A–93A and switch arms 91–93 to the input terminals of control transformer 108. The output signal from transformer 108 is coupled through sector width servo amplifier 109 to a motor-generator set including motor 110 and induction generator 111. The output signal from motor-generator set 110–111 is coupled by mechanical means (illustrated as dashed lines in FIGURES 2 and 3) to the rotors of "on" control transformer 71 and "off" control transformer 73 (FIG. 2). Thus it is evident that control transformers 71–73 provide output signals representative of the true bearing of the rotors of synchro generators 52 and 53 as modified by the center bearing and sector width signals coupled from the equipment illustrated in FIG. 3 of the drawings, including the center bearing and sector width synchro generators 99 and 100.

Figure 4:
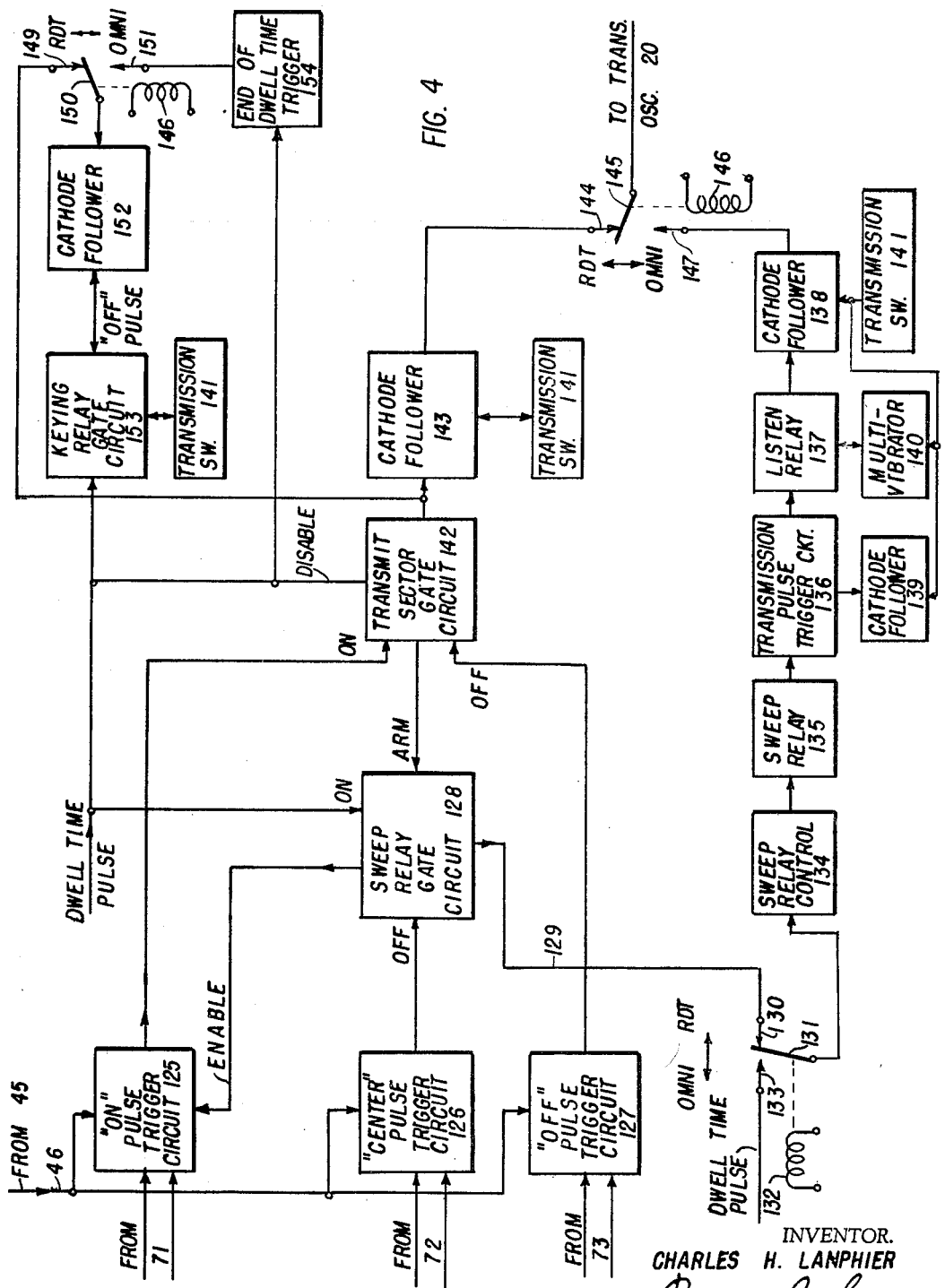

The output signals from control transformers 71, 72, and 73 are coupled to the input sides of pulse trigger circuits 125, 126, and 127, respectively (FIG. 4). It is noted that the output signal from reference oscillator 45 (FIG. 2) is also coupled over conductor 46 to each of pulse trigger circuits 125, 126 and 127 (FIG. 4).

The pulse trigger circuits 125, 126 and 127 include conventional phase detector circuitry, and accordingly are not shown in greater detail. Such circuitry produces an output signal which, after filtering, is a varying voltage, which voltage is positive during 180° of the rotation of either synchro generator 52 or 53 and negative during the other 180°. This varying voltage is utilized in each of the trigger circuits 125–127 to control the firing or conductivity of a particular circuit, thus providing a pulse at a definite angular position relative to the rotation of the rotor of either generator 52 or 53. Suitable calibration procedures may be utilized to establish the exact relationship between the "on," "center," and "off" pulse trigger circuits 125–127, and the zero index of the rotors of generators 52 and 53.

The pulses formed in the manner described above are utilized to control the keying of transmitter oscillator 20 (FIG. 1) and thus effect the release of the sweep of the AN/SQS-4 sonar equipment, or whatever equipment is utilized in conjunction with the invention structure. In describing such control of the keying circuits, reference is made to the "dwell time" pulse of the associated sonar equipment. Briefly, in a sonar equipment many operations are initiated and controlled during various intervals in a single cycle of operation. One portion of a cycle includes the time during which a visual or aural indication of returning echoes is presented. Such time may be termed the "sweep" time. The "dwell" time comprises the time for a single cycle minus the time elapsed during the sweep portion of such cycle.

In FIG. 4 the circuit for initiating the sweep of associated sonar equipment when RDT transmission is effected is illustrated as sweep relay gate 128. The dwell time pulse from the associated equipment, which commences at sweep flyback, changes the condition of sweep relay gate 128 and effects the coupling of a signal from sweep relay gate 128 over conductor 129. Such signal is coupled over contacts 130 and switch arm 131 of RDT-OMNI relay 132 to the input side of sweep relay control circuit 134. This signal is coupled from the output side of sweep relay control circuit 134 through sweep relay 135, energizing this relay, through transmission pulse trigger circuit 136 to listen relay 137, also energizing the listen relay.

Operation of the sweep relay gate circuit 128 conditions the "on" pulse trigger circuit 125 for operation, permitting circuit 125 to make a pulse each time the rotor of either generator 52 or 53 goes through the position which corresponds to the beginning edge of the selected transmitting sector. However, the dwell time pulse is also coupled to transmit sector gate 142, and is effective to disable circuit 142, for example, by holding the control grid of an electron discharge device at a potential such that the device cannot pass a stream of electrons. Thus the production of the "on" pulses by trigger circuit 125 is ineffective by reason of the disablement of transmit sector gate circuit 142. Similarly the transmit sector gate circuit 142 is effective to produce a bias voltage by means not shown in the diagrams but well understood in the art to render ineffective the production of "center" and "off" pulses at this time. Thus the "off" pulse trigger circuit 127 cannot at this time reset the transmit sector gate circuit 142, because it is firmly held by reason of the dwell time pulse coupled to gate circuit 142.

Figure 5:
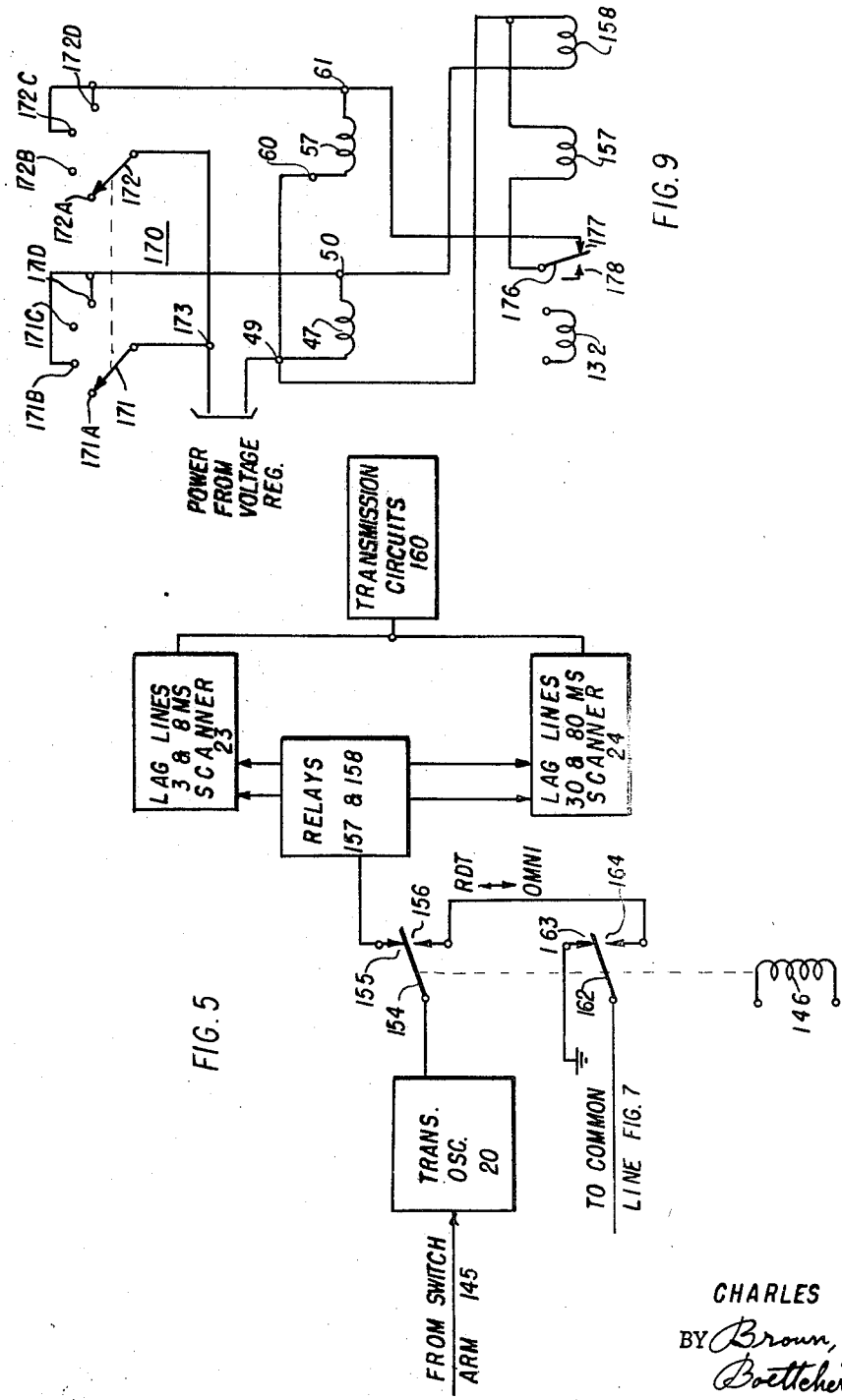

However, after the dwell time pulse has ended, the transmit sector gate circuit 142 is free to change its condition upon receipt of the first "on" pulse. Thus, receipt of the first "on" pulse after the end of the dwell time interval causes the transmit sector gate circuit 142 to change its condition (e.g., from non-conductive to conductive) and produce a DC pulse, which is coupled to the input side of cathode follower 143. Provided that the correct interlock potential is present at the anode of cathode follower 143, the pulse thus created is coupled over contacts 144 and switch arm 145 of RDT-OMNI relay 146, to the input side of transmitter oscillator 20 (FIGURE 5).

The change in condition of the transmit sector gate circuit 142 effected at the end of the dwell time pulse changes the bias voltage referred to above and thus conditions the sweep relay gate circuit 128 to initiate the sweep responsive to the reception by circuit 128 of the next "center" pulse from trigger circuit 126. The "off" pulse from off pulse trigger circuit 127 resets the transmit sector gate circuit 142 and stops transmission. During this interval, the sweep relay gate circuit 128 is disabled by the "center" pulse from trigger circuits 126 to prevent another transmission responsive to receipt of the next "on" pulse during the next revolution of the rotor of either generator 52 or 53 (FIGURE 2).

The spacing between the "on" and "off" pulses in the RDT-search mode of operation depends upon the signal coupled from the motor-generator set 110–111 (FIGURE 3). As is evident from the foregoing explanation, in the RDT-search mode, a signal is coupled from the locked rotor synchro generator 101 to control the transmission by rotating a beam through a 300° sector. The sector width is accordingly fixed during the RDT-search mode of operation. From FIGURE 3 it is also evident that the sector which is searched in the RDT-search mode is centered upon the bearing corresponding to the heading of the ship.

Protective means may be incorporated in the inventive structure to half transmission if, for any reason, the transmit sector gate circuit 142 does not reset after a predetermined length of time. Such means are known and understood, and are not illustrated in the drawings.

The DC pulse which is coupled from transmit sector gate circuit 142 to cathode follower 143 is also coupled over contacts 149 and switch arm 150 of RDT-OMNI relay 146 to the input side of cathode follower 152. Cathode follower 152 is effective to create an "off" pulse and couple such pulse to the keying relay gate circuit 153. Another input signal indicative of the dwell time pulse is also coupled to gate circuit 153. The trailing edge of the pulse coupled from cathode follower 152 is utilized to reset the keying relay gate circuit 153. Responsive to the reset of gate circuit 153, the transmit-listen relays are transferred to the listen condition.

FIGURE 5 illustrates the manner in which the output signal from transmitter oscillator 20 is coupled over switch arm 154 and contacts 155 of relay 146 to the circuitry including relays 157 and 158, which will be shown in more detail hereinafter. Depending upon the condition of relays 157 and 158, the signals from transmitter oscillator 20 are coupled either through one of the lag lines for the 3 and 8 millisecond scanner 23 to the transmission circuits 160, or through one of the lag lines for the 30 and 80 millisecond scanner 24 to transmission circuits 160. The scanner 23 is driven at a speed of 667 r.p.m. The synchro generator 52 (FIGURE 2) rotates at a ratio of 1:1 with the rotor of scanner 23. Similarly, the rotor of synchro generator 53 (FIGURE 2) rotates at a 1:1 ratio with the rotor of scanner 24. Thus the correlation between the position of the rotors of scanners 23 and 24 and the production of the keying pulses is evident.

Because the lag lines and the other construction of scanners 23 and 24 are identical, only the configuration and operation of scanner 23 will be described. The only difference in these equipments is the speed at which each is driven.

Figure 6:
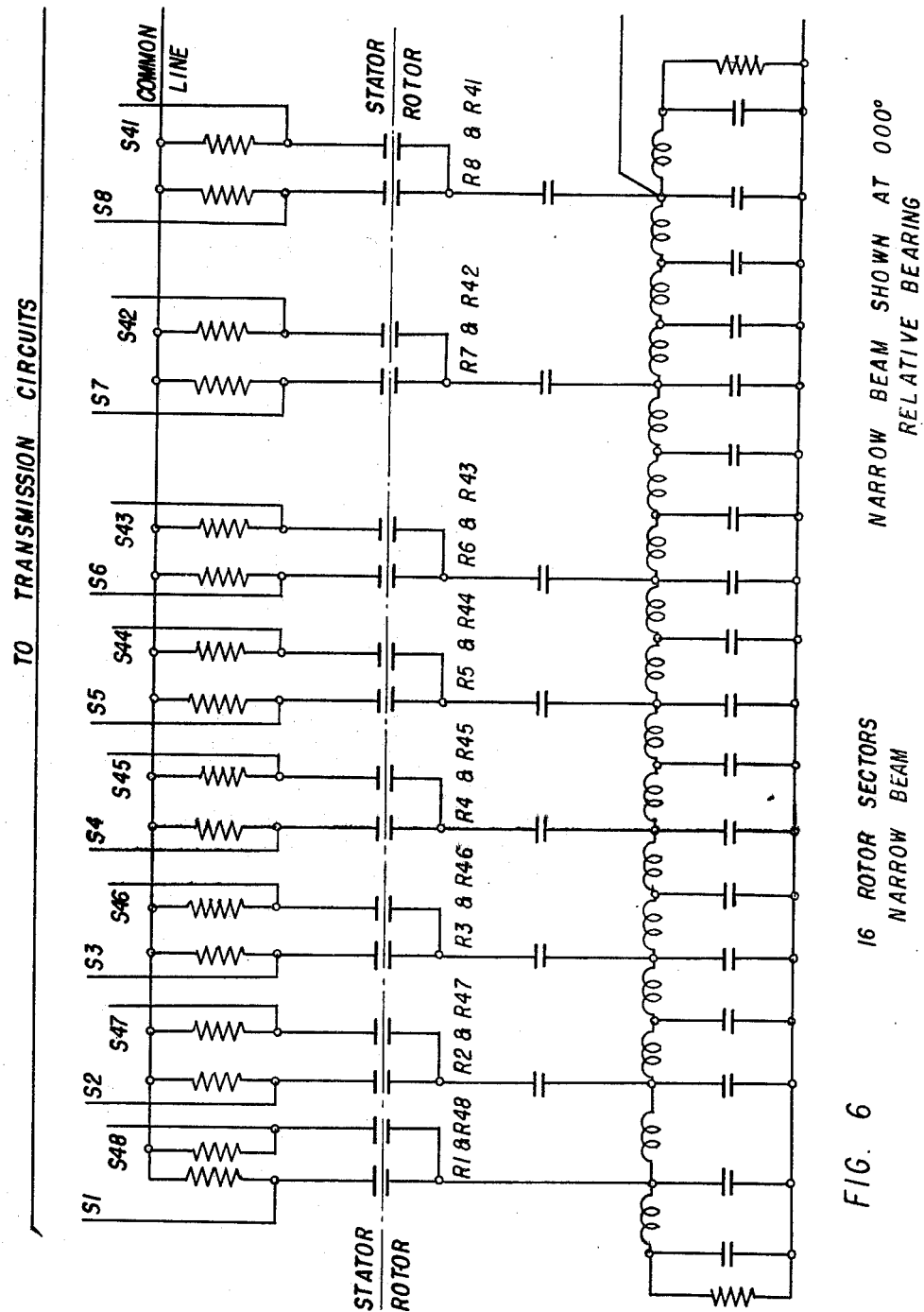

In general, scanners of the type such as those illustrated in FIGURE 5 are known, and are taught, for example, in Patent No. 2,790,955, issued to C. H. Lanphier on Apr. 30, 1957, and assigned to the present assignee. The reference teaches capacitative coupling of signals from a plurality of segments on a rotor (such as rotor 49, FIGURE 1 of the reference) to corresponding segments on a stator (48), and the use of a lag line (such as that shown enclosed in housing 71) for effecting phasing and shading of the signals coupled to the rotor, and thus creating a directive pattern in the signals present in the stator elements. The scanner construction of the invention differs from that taught in Patent No. 2,790,955, in that two scanners are used and the rotor of each scanner in the inventive structure has not one, but two lag lines disposed thereon. Thus the lag lines for the scanner 23 are illustrated in FIGURES 6 and 7 of the drawings. The leads coupled from the transmitter oscillator 20 are shown in FIGURE 7, and as there illustrated, are coupled over slip-rings to either the lag line for creating the narrow 12° beam, shown in FIGURE 6, or to the lag line for producing the broad 32° beam, illustrated in FIGURE 7. Such slip rings are analogous to the slip rings 77, 78, and 79, shown in FIGURE 1 of the above cited Lanphier patent.

The formation of the desired signals by phasing and shading in the lag lines is well known and understood in the art. Signals are coupled to the various rotor elements, identified in FIGURES 6 and 7 by a reference numeral preceded by the letter R. Similarly, the connections to the various stator elements are designated with the appropriate reference numerals preceded by the letter S.

Figure 8B:
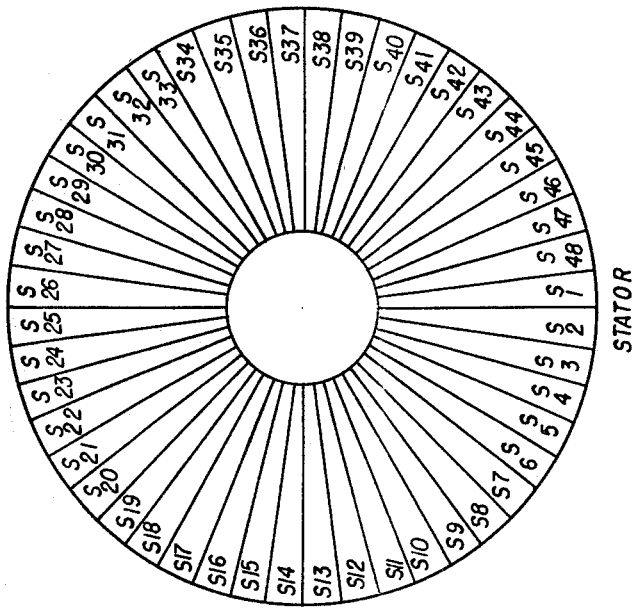
FIGURES 8A and 8B are illustrative diagrams useful in understanding the disposition of circuit elements shown in FIGURES 6 and 7.
Figure 8A:
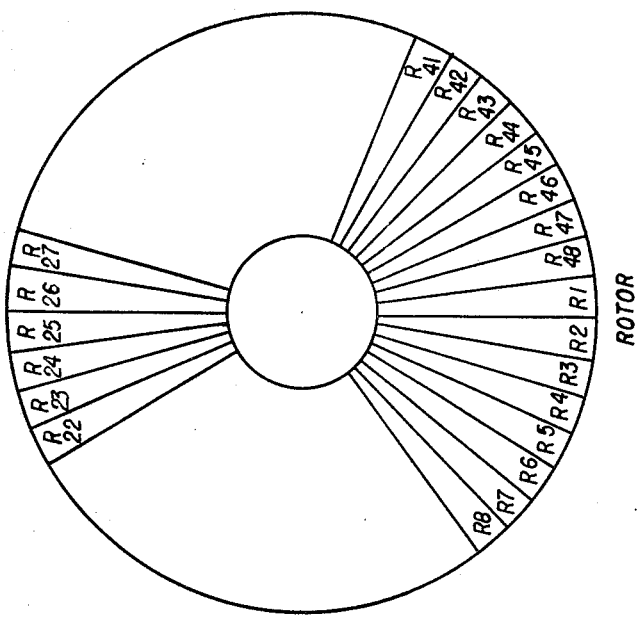

FIGURES 8A and 8B show generally the disposition of the rotor and stator elements. It will be understood that FIGURES 8A and 8B are not actual representations, in that each element is separated by suitable insulating means from the contiguous elements. Thus it is apparent that if the required signals for forming the narrow beam (12°) are coupled to the rotor elements R1-R8 and R41-R48, the directive beam signals will be coupled to whichever elements of the stator are adjacent the 16 rotor elements R1-R8 and R41-R48. Conversely, when it is desired to utilize the output of the lag line illustrated in FIGURE 7 to form a broad beam signal for transmission, suitable signals are coupled to the rotor elements R22-R27 in FIGURE 7. As the rotor passes the adjacent stator, the signal suitable for forming the broad beam (32°) is coupled to the adjacent stator elements. Thus the formation of either the narrow or broad beam, and the disposition of two separate lag lines in each of the transmitter scanners 23 and 24, is evident.

The 3 millisecond pulse length is a resultant obtained by selecting the narrow beam (12°) of scanner 23, and rotating it at the 667 r.p.m. rate of rotation of scanner 23. The 8 millisecond pulse length is a resultant obtained by selecting the broad beam (32°) of this same scanner 23 and rotating it this same rate of 667 r.p.m.

Referring now to the 30 and 80 millisecond pulse lengths, the 30 millisecond pulse length is a resultant obtained by selecting the narrow beam (12°) of the other or second scanner 24, and rotating it at the much slower 67 r.p.m. rate of rotation of this other scanner 24; and the 80 millisecond pulse length is a resultant obtained by selecting the broad beam (32°) of this latter scanner 24 rotating at this slower 67 r.p.m. rate.

It is apparent that because the center axis of the group of rotor elements used to form the narrow beam is disposed at 180° from the axis of the group of elements used to form the broad beam, and because the pulse trigger circuits 125, 126, and 127 (FIGURE 4) include phase detector networks, some means for compensating for the 180° displacement of the lag lines in the rotors of the transmitter scanners is required. This is the function of reversing relay 47, shown in FIGURE 2 as coupled between reference oscillator 45 and synchro generators 52 and 53. It is evident that operation of relay 47 reverses by 180° the polarity of the signals coupled to the input terminals of synchro generators 52 and 53.

Pulse selection relay 57 (FIGURE 2) is utilized to select the output signal from either synchro generator 52 or 53, depending upon the pulse length desired, and to couple that output signal to the input terminals of the differential generator 58. It is evident that relays analogous to relays 47 and 57 are required to selectively energize one of the lag lines associated with scanner 23 or scanner 24. This is the function and operation of relays 157 and 158.

FIGURE 9 shows the pulse length selection switch 170, comprising switch arms 171 and 172, which are joined together for simultaneous movement, and contacts 171A-171D and 172A-172D. A source of regulated power is coupled to terminals 49 and 173. Relays 47 and 57 of FIGURE 2 are also shown in FIGURE 9; the contacts of these relays are not illustrated in FIGURE 9, because the operation will be understood by reference to FIGURE 2 and from the foregoing explanation. It is noted that relays 157 and 158 are connected for energization in conjunction with relays 47 and 57. A portion of the energizing path for relay 57 is completed over switch arm 176 and contacts 177 of relay 132, the winding of which is also shown in FIGURE 4.

In FIGURE 9 it is evident that with switch 170 in the position shown, with switch arm 171 engaging contacts 171A and switch arm 172 engaging contacts 172A, no energizing circuits are completed and the windings of relays 47, 57, 157, and 158 are deenergized. In this position the equipment is connected to provide a pulse of 3 milliseconds and to produce a narrow beam of 12°. Referring to FIGURE 2, it is apparent that when relay 47 is deenergized the output of reference oscillator 45 is coupled to the input terminals of both generators 52 and 53, but, because relay 57 is at this time deenergized, only the output signal from generator 52 is coupled to the input terminals of differential generator 58. Relays 157 and 158 perform a similar operation in coupling the output signal from transmitter oscillator 20 through scanner 23 to transmission circuits 160.

In FIGURE 9 when the switch arms 171 and 172 are displaced to engage contacts 171B and 172B, respectively, an obvious energizing circuit is completed for relay 47 and a similar energizing circuit is completed for relay 158. Referring to FIGURE 2, it is evident that such operation is effective to reverse the polarity of the input signal to synchro generator 52. In this position of switch 170, an 8 millisecond pulse length is produced and the equipment is effective to transmit a broad beam of 32 degrees. The operation of relay 158 is similarly effective to perform a corresponding function with its associated circuitry.

When switch 170 is displaced so that switch arms 171 and 172 engage contacts 171C and 172C, relay 57 is energized over an obvious path, and relay 157 is similarly energized over a parallel path. Referring again to FIGURE 2, it is evident that the energization of relay 57 causes the output of synchro generator 53 to be coupled to the input terminals of differential generator 58. The energization of relay 157 effects a corresponding function in its related circuit. In this position the equipment is effective to produce a 30 millisecond pulse, and to direct the energy into the water in a narrow beam of 12 degrees in width.

In the last position of switch 170 (FIGURE 9), the switch arms 171 and 172 engage contacts 171D and 172D, and each of relays 47, 57, 157 and 158 is energized. Referring to FIGURE 2, it is evident that such operation reverses the polarity of the input signal to synchro generator 53 and couples the output signal from generator 53 through the contacts of relay 57 to the input terminals of differential generator 58. The energization of relays 157 and 158 effect corresponding functions in the transmitter scanner circuitry. In this position the equipment is operative to produce a pulse length of 80 milliseconds, and to direct such energy into the water in a broad beam of 32 degrees in width.

The operation of the inventive equipment in conjunction with standard sonar gear has been described, and particularly the RDT transmission, search mode of operation has been taught. The selection of the various pulse lengths or transmission intervals of 3, 8, 30 and 80 milliseconds has also been set forth.

RDT TRANSMISSION: SEARCH-ATTACK MODE

Referring to FIG. 3, it will be recalled that in the "search" mode, the center bearing of the sector to be searched is determined by a signal representing the ship's course, and the width of this sector is fixed at 300°. When the switch arms 91–96 of switch 90 are displaced to engage contacts 91B–96B to effect operation in the "search-attack" mode, the center bearing of the sector to be searched is variable through 360° in azimuth and the width of such sector is continuously variable from 20 to 300°.

It is evident that in the search-attack mode, the output terminals of center bearing synchro generator 99 are coupled over contacts 94B–96B and switch arms 94–96 to the input terminals of control transformer 104. From the foregoing description it is evident that the signal coupled to this point determines the center bearing of sector to be searched. Such signal is variable by effecting angular displacement of hand wheel 102 of center bearing synchro generator 99. Accordingly, it is evident that in the search-attack mode, the center bearing is continuously adjustable by a simple manual control.

The sector width is similarly variable by a simple control, specifically, by displacing hand wheel 103 of sector width synchro generator 100. The resulting varying signal is coupled over contacts 91B–93B and switch 91–93 to the input terminals of control transformer 108, and subsequently coupled through previously described circuitry to determine the width of the sector to be searched.

In all other respects, the operation of the inventive structure is identical to that described in conjunction with the search mode of RDT transmission.

RDT TRANSMISSION: ATTACK MODE

To effect operation of the equipment in the "attack" mode, the switch arms 91–96 of switch 90 are displaced to engage contacts 91C–96C. It is apparent that contacts 91C–93C are connected to contacts 91B–93B. Accordingly, the operation of the sector width control is identical in both the "search-attack" and "attack" modes of RDT transmission.

However, the center bearing of the sector to be searched in the attack mode is not controlled by the center bearing synchro generator 99. Instead, a signal indicative of the relative bearing of a target with respect to the ship is coupled to terminals 94C–96C, and over switch arms 94–96 to the input terminals of control transformer 104. Accordingly, in the attack mode of operation, the sector to be searched is centered along the same bearing as that of the target which is being attached. Such a signal may be readily derived, for example, from the cursor circuits at the associated equipment, in a manner well known and understood in the art.

In brief summary of the sector width and center bearing control functions, it is recalled that in the search mode of operation the center bearing of the sector to be searched is coincident with the heading of the ship and the width of the sector is fixed at 300°. In the search-attack mode of operation, the center bearing is continuously variable through 360° and the width of such sector is adjustable from 20 to 300°. In the attack mode, the center bearing of the sector to be searched is fixed along the same bearing as that of the target, and the sector width is still adjustable from 20 to 300°.

OMNI (OMNIDIRECTIONAL) TRANSMISSION

If desired, the conventional sonar equipment associated with the inventive structure may be utilized to produce OMNI transmission. In the OMNI transmission condition, a fixed pulse length of 6 milliseconds is provided for the equipment. To permit OMNI transmission, relays 132 and 146 (FIGS. 4 and 5) may be energized by any suitable means (not shown).

The stator circuit of each of the transmission scanners 23 and 24 (FIG. 5) includes equal-value resistors connected from each stator segment to a common line, as shown in FIGS. 6 and 7. In the RDT type of transmission, the common line is connected to ground over switch arm 162 and contacts 163 of relay 146 (FIG. 5). For OMNI transmission, however, relay 146 is energized and the output of transmitter oscillator 20 is coupled over switch arm 154, contacts 156 and 164, switch arm 162, to the common line in FIGS. 6 and 7, and thence to the transmission circuits, thereby furnishing a common signal to the amplifiers for each of the 48 transducer staves.

In FIGURE 4, it is apparent that switch arm 131 of relay 132 is displaced to engage contacts 133 upon the energization of the relay winding. Thus the dwell time pulse is coupled through the channel including sweep relay control circuit 134 and the other circuitry coupled thereto. The sweep relay 135 remains closed until the end of the dwell time and then opens. The opening of sweep relay 135 delivers a pulse to the transmission pulse trigger circuit 136, causing trigger circuit 136 to conduct and produce the 6 millisecond pulse. The transmission pulse trigger circuit 136 provides a DC pulse which is coupled through listen relay 137 and cathode follower 138, over contacts 147 and switch arm 145 of relay 146, to the input of transmitter oscillator 20. In this manner the transmitter oscillator is provided with the necessary DC pulse in the OMNI transmission condition.

The dwell time pulse also effects operation of the transmit-listen relays by altering the condition of the keying relay gate circuit 153, the dwell time pulse being coupled directly to gate circuit 153, and also coupled to the end of dwell time trigger 154, over contacts 151 and switch arm 150, through cathode follower 152, to provide the off pulse for keying relay gate circuit 153.

OMNI-RDT TRANSMISSION

It is evident that the equipment may be conditioned for OMNI transmission by energization of relays 132 and 146, and then conditioned for operation in the RDT transmission by de-energization of these two relays. Thus, to alternate transmission between the RDT and OMNI types, it is only required to energize and de-energize relays 132 and 146 for successive transmissions. A conventional relay control circuit may be utilized and connected to operate these relays for this purpose. For example, the circuit may comprise a flip-flop multivibrator, which changes its condition responsive to the receipt of the end of each dwell time pulse. Thus such a circuit is readily incorporated into the inventive structure to provide for alternate RDT and OMNI type transmissions. Because such circuitry is well known and understood in the art, it is not illustrated in the drawings.

SUMMARY

From the foregoing explanation of the novel transmitting equipment, it is evident that the RDT transmitting system might be incorporated into existing sonar equipment and that it might be employed with a video, audio, or multiple channel aural receiver or a combination of these.

The RDT transmitting system produces greater effective range than the OMNI type of transmissions and far greater speed of scanning than the older "searchlight" systems. Additionally, the flexibility of combining this system with the OMNI type of transmission for various modes of search allows the use of the best system under various operating conditions.

What is claimed is:

1. An echo ranging system including a stationary transmitting and receiving transducer carried by the hull of a ship, means for transmitting a rotating beam of energy through said stationary transducer during a transmission interval, means for controlling the duration of said interval including a pair of transmitter scanners, means coupled to each of said scanners for driving same at different angular velocities, a pair of beam forming networks in each of said scanners, each of said networks being effective responsive to the energization thereof to provide an output signal of predetermined characteristics for producing a beam of a different predetermined width, and means for selectively energizing either one of said networks associated with either one of said scanners whereby to provide a transmission interval having a desired pulse length which is a resultant obtained by selecting a particular one of said two beam forming networks of a particular one of said two scanners and rotating it at the angular velocity of the selected scanner.

2. An echo ranging system comprising a stationary transmitting and receiving transducer projecting from the hull of a ship, for transmitting energy through the water during a transmission interval, a first means for coupling a first signal to said transducer, said first means comprising apparatus for causing said first signal to be of predetermined characteristics to produce a directive beam of energy of limited horizontal span emanating from said transducer, a second means for coupling a second signal to said transducer, said second means comprising apparatus for causing said second signal to be of different characteristics to produce an omnidirectional beam of energy emanating from said transducer simultaneously in all directions, and control means coupled to said first and second means for effecting alternating operation of said first and second means to produce alternating directive beams and omnidirectional beams of energy.

3. In an echo ranging system for a ship, the combination of a stationary transmitting and receiving transducer carried by the ship, said transducer comprising a circular array of staves adapted to transmit and receive vibratory energy through the water, and rotating directional transmission mechanism for causing the staves of said transducer to transmit a directive beam of energy into the water during a transmission interval, said transmission mechanism comprising a transmitting scanner having a stator element and a rotor element, interacting capacitative segments carried by said stator element and said rotor element, the capacitative segments of said stator element being operatively connected with the staves of said transducer, a first beam forming network embodied in the rotor element of said transmitting scanner connected to capacitative segments of said rotor element for causing such segments to transmit a first rotating beam pattern of energy to the segments of said stator element, and a second beam forming network also embodied in the rotor element of said transmitting scanner connected to said capacitative segments of said rotor element for causing said segments to transmit a second rotating beam pattern of energy of a different characteristic than said first beam pattern to the segments of said stator element.

4. In an echo ranging system for a ship, the combination of a stationary transmitting and receiving transducer carried by the ship, said transducer comprising a circular array of staves adapted to transmit and receive vibratory energy through the water, and rotating directional transmission mechanism for causing the staves of said transducer to transmit a directive beam of energy into the water during a transmission interval, said transmission mechanism comprising a transmitting scanner having a stator element and a rotor element, interacting capacitative segments carried by said stator element and said rotor element, the capacitative segments of said stator element being operatively connected with the staves of said transducer, a first beam forming network embodied in the rotor element of said transmitting scanner connected to the segments of said rotor element for causing such segments to transmit a rotating beam pattern of relatively wide width to the segments of said stator element, a second beam forming network embodied in the rotor element of said transmitting scanner connected to the segments of said rotor element for causing such segments to transmit a rotating beam pattern of relatively narrow width to the segments of said stator element, and selective means for selectively rendering either said first beam forming network or said second beam forming network operative to transmit said relatively wide beam pattern or said relatively narrow beam pattern through said transducer.

5. In an echo ranging system for a ship, the combination of a stationary transmitting and receiving transducer projecting rigidly downwardly from the hull of the ship, said transducer comprising a circular array of staves adapted to transmit and receive vibratory energy through the water, and rotating directional transmission mechanism for causing the staves of said transducer to transmit a directive beam of energy into the water during the transmission interval, said transmission mechanism comprising first and second transmitting scanners each having a stator element and a rotor element, the rotor elements of said two scanners revolving at different speeds, interacting capacitative segments on the stator element and on the rotor element of each of said first and second scanners, the capacitative segments on the stator elements of both of said scanners being operatively connected with the staves of said transducer, a first beam forming network embodied in the rotor element of said first scanner connected to the segments of said rotor element for causing such segments to transmit a rotating beam pattern at one rate of rotation to the segments of the associated stator element, a second beam forming network embodied in the rotor element of said second transmitting scanner connected to the segments of said rotor element for causing said segments to transmit a rotating beam pattern at a different rotative rate to the segments of its associated stator element, and selecting mechanism for selectively rendering either said first beam forming network or said second beam forming network operative to transmit its beam pattern through said transducer.

6. In an echo ranging system for a ship, the combination of a stationary transmitting and receiving transducer projecting from the hull of the ship, said transducer comprising a circular array of staves adapted to transmit and receive vibratory energy through the water, and rotating directional transmission mechanism for causing the staves of said transducer to transmit directive beams of energy of different pulse lengths into the water during a transmission interval, said transmission mechanism comprising first and second transmitting scanners each comprising a stator element and a rotor element, the rotor elements of said two scanners revolving at different speeds, interacting capacitative segments on the stator elements and on the rotor elements of said first and second transmitting scanners, the capacitative segments on the stator elements of both of said scanners being operatively connected with the staves of said transducer, two beam forming networks embodied in the rotor element of each of said transmitting scanners connected to different sets of the capacitative segments of the respective rotor element, whereby said two beam forming networks are operative to cause the transmission of directive beams of different beam widths from each of said two transmitting scanners, selecting means for selecting either of said two transmitting scanners for effecting beam transmission, and selecting means for selecting either of the two beam forming networks of the selected scanner for effecting beam transmission.

7. In an echo ranging system for a ship, the combination of a stationary transmitting and receiving transducer carried by the ship, said transducer comprising a circular array of staves adapted to transmit and receive vibratory energy through the water, and rotating directional transmission mechanism for causing the staves of said transducer to transmit a directive beam of energy into the water during a transmission interval, said transmission mechanism comprising a transmitting scanner having a stator element and a rotor element, interacting capacitative segments carried by said stator element and said rotor element, the capacitative segments of said stator element being operatively connected with the staves of said transducer, two beam forming networks embodied in the rotor element of said transmitting scanner connected to the segments of said rotor element for causing such segments to transmit selectively either one of two rotating beam patterns of energy of different characteristics to the segments of said stator element, and sector adjusting means for adjusting the sector through which either of said rotating beam patterns is transmitted.

References Cited

UNITED STATES PATENTS

| | | | |
|---|---|---|---|
| 2,473,974 | 6/1949 | Schuck | 340—3 |
| 2,475,363 | 7/1949 | Turner | 340—3 |
| 2,505,587 | 4/1950 | Smith | 340—3 |
| 2,515,154 | 7/1950 | Lanphier | 340—11 |
| 2,645,741 | 7/1953 | Westervelt | 340—6 |
| 2,697,822 | 12/1954 | Schuck | 340—3 |
| 2,776,396 | 1/1957 | Gille et al. | 340—3 |
| 2,786,193 | 3/1957 | Rich | 340—6 |
| 2,790,955 | 4/1957 | Lanphier | 340—3 |
| 2,925,581 | 2/1960 | Hackley et al. | 340—6 |
| 2,962,694 | 11/1960 | Batchelder | 340—3 |
| 2,767,586 | 10/1956 | Ross | 340—6 |
| 2,972,732 | 2/1961 | Hammond | 340—5 |

RICHARD A. FARLEY, Primary Examiner

U.S. Cl. X.R.
340—6, 16